US012731401B2

(12) United States Patent
Rothschild

(10) Patent No.: US 12,731,401 B2
(45) **Date of Patent: *Sep. 8, 2026**

(54) SYSTEM, METHOD, AND DEVICE TO PROACTIVELY DETECT IN REAL TIME ONE OR MORE THREATS IN CROWDED AREAS

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/306,668

(22) Filed: Aug. 21, 2025

(65) Prior Publication Data

US 2026/0073690 A1 Mar. 12, 2026

Related U.S. Application Data

(63) Continuation of application No. 19/067,655, filed on Feb. 28, 2025, now Pat. No. 12,417,628, which is a (Continued)

(51) Int. Cl.

*G06V 20/40* (2022.01)
*G06V 10/82* (2022.01)
*G06V 20/17* (2022.01)
*G06V 20/52* (2022.01)
*G06V 40/16* (2022.01)

(Continued)

(52) U.S. Cl.

CPC .............. *G06V 20/44* (2022.01); *G06V 10/82* (2022.01); *G06V 20/17* (2022.01); *G06V 20/53* (2022.01); *G06V 40/172* (2022.01); *G06V 40/20* (2022.01); *H04L 9/008* (2013.01)

(58) Field of Classification Search

CPC ...... G06V 20/44; G06V 20/17; G06V 40/172; G06V 10/82; G06V 40/20; G06V 20/53; H04L 9/008

See application file for complete search history.

(56) References Cited

U.S. PATENT DOCUMENTS

2018/0268674 A1* 9/2018 Siminoff ................ H04N 7/186
2019/0019380 A1* 1/2019 Williams ............... G08B 19/00

(Continued)

*Primary Examiner* — Syed Haider

(74) *Attorney, Agent, or Firm* — Dobbin IP Law, PC; Geoffrey E. Dobbin

(57) ABSTRACT

The present disclosure relates to a system to proactively detect in real time one or more threats in crowded areas. The present disclosure presents a proactive system for real-time threat detection in crowded areas. Utilizing a network of imaging sensors and advanced machine learning algorithms, the system identifies suspicious individuals, objects, and behavioral patterns within a predefined area. The system detects potential threats such as individuals on watch lists, suspicious objects like unattended bags, and abnormal behaviors indicative of security risks, by continuously monitoring and analyzing images and video feeds. Upon detection, the system promptly notifies authorities, providing detailed information on threat location, suspected individuals, and behavioral analysis. Privacy-preserving measures, including encryption of facial recognition data, ensure compliance with privacy regulations. The present disclosure offers a scalable, efficient, and automated solution to enhance security measures, reduce response times, and safeguard public safety in dynamic urban environments.

16 Claims, 4 Drawing Sheets

Related U.S. Application Data continuation of application No. 18/828,623, filed on Sep. 9, 2024, now Pat. No. 12,243,306.

(51) Int. Cl.

*G06V 40/20* (2022.01)
*H04L 9/00* (2022.01)

(56) References Cited

U.S. PATENT DOCUMENTS

| | | | | |
|---|---|---|---|---|
| 2019/0102661 | A1* | 4/2019 | Ikeda | G06N 20/00 |
| 2021/0158056 | A1* | 5/2021 | Galarneau | G06V 40/174 |
| 2022/0189266 | A1* | 6/2022 | Millar | G08B 13/19684 |
| 2024/0248233 | A1* | 7/2024 | Kair | G06N 20/00 |

* cited by examiner

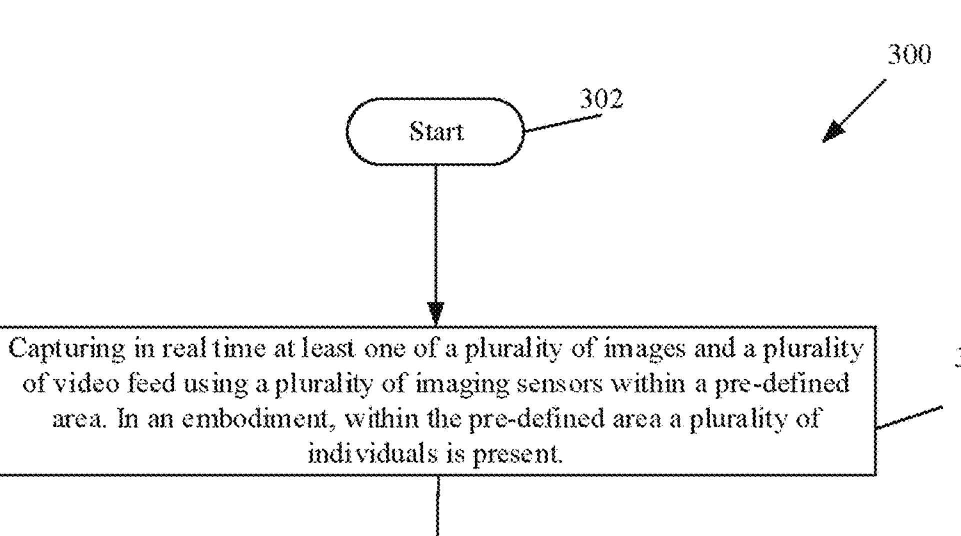

306
Performing at least one of identifying one or more suspected individuals or identifying one or more suspicious objects within the at least one of the plurality of images and the plurality of video feed.

308
Identifying the one or more threats based on at least one of the identified one or more suspected individuals, the identified one or more suspicious objects.

310
Determining a precise location of the identified one or more threats; and transmitting a notification of the identified one or more threats to the one or more authorities and the notification comprises at least one of the precise locations of the threat, the identified one or more suspected individuals, the identified one or more suspicious objects and the plurality of images and the plurality of video feed.

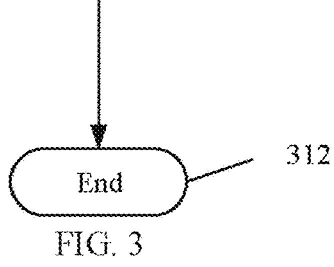

FIG. 3

SYSTEM, METHOD, AND DEVICE TO PROACTIVELY DETECT IN REAL TIME ONE OR MORE THREATS IN CROWDED AREAS

TECHNICAL FIELD

The present invention relates to a security and surveillance technology, particularly in the context of threat detection and prevention in crowded areas.

BACKGROUND

In today's dynamic and densely populated urban environments, ensuring public safety presents an ongoing challenge for authorities worldwide. Crowded areas such as transportation hubs, stadiums, shopping malls, and city centres are particularly vulnerable to security threats ranging from petty crime to terrorism. Traditional surveillance methods have proven insufficient in addressing the complexities of these environments, often leading to delayed responses and increased risks to public safety. However, several technical challenges must be addressed for better security and surveillance in crowded areas.

Traditionally, the sheer volume of individuals in crowded areas poses a significant challenge. Human operators tasked with monitoring these environments struggle to process vast amounts of visual data in real time, leading to oversight and missed threats. Additionally, the dynamic nature of crowded spaces, with people moving in various directions and engaging in diverse activities, adds complexity to surveillance efforts. Human surveillance is inherently subjective and prone to bias. Security personnel may interpret behaviors differently based on their experiences and perceptions, leading to inconsistent threat assessments. This subjectivity can result in false alarms, wasted resources, and, in some cases, inadequate responses to genuine threats. Traditional surveillance systems often have blind spots and limitations in coverage, especially in large and complex environments. This can leave certain areas vulnerable to security breaches. Moreover, the time it takes for human operators to detect and respond to potential threats can be lengthy, allowing incidents to escalate before intervention occurs. The implementation of surveillance measures in public spaces raises privacy concerns among the public. Individuals may feel uncomfortable with constant monitoring of their activities, leading to ethical and legal considerations for deploying surveillance technologies in crowded areas. In recent times urban populations have continued to grow, and the scalability of security measures has become increasingly important. Traditional surveillance methods often struggle to adapt to evolving threats and changing demographics, requiring significant resources to maintain effectiveness.

Traditional security measures often rely on human surveillance, where security personnel visually monitor crowded areas for suspicious activities. However, this approach is limited by human subjectivity, fatigue, and the inability to process large volumes of data in real time. Additionally, manual surveillance is resource-intensive and often ineffective in rapidly changing environments with high volumes of people.

One of the technical problems is that closed-circuit television (CCTV) cameras are commonly deployed in crowded areas to monitor activities. While fixed CCTV cameras provide continuous surveillance, they suffer from blind spots and limited coverage. They are also passive systems that require human intervention to review footage and identify potential threats, leading to delays in response times and increased reliance on human operators. Another technical problem is that some security systems employ behavioral profiling techniques to identify suspicious individuals based on their actions or movements. However, these methods are prone to false positives and can result in discrimination or privacy violations. Additionally, behavioral profiling relies on predefined criteria, which may not accurately capture the nuances of human behavior in crowded environments.

One another technical problem is that security personnel may manually assess potential threats based on visual cues, such as suspicious behavior or the presence of unattended bags. While this approach allows for human judgment and discretion, it is subjective and inconsistent. Security personnel may miss subtle indicators of threats or misinterpret innocent behaviors, leading to false alarms or overlooked risks. Furthermore, some surveillance technologies, such as facial recognition systems, have been proposed to enhance security in crowded areas. However, these technologies raise significant privacy concerns and ethical considerations. Facial recognition systems can infringe on individuals' privacy rights and contribute to mass surveillance, leading to public backlash and legal challenges. Additionally, data analytics and predictive modelling techniques are increasingly being used to analyze surveillance data and identify patterns indicative of potential threats. While these methods offer insights into security trends and vulnerabilities, they often require large datasets and sophisticated algorithms to be effective. Moreover, predictive modelling may be limited by the availability and quality of data, as well as the accuracy of predictive algorithms.

To overcome the shortcomings of the conventional methods is a need for a proactive and efficient method of detecting threats in crowded areas in real-time. Traditional security measures often rely on human surveillance, which can be subjective, resource-intensive, and prone to errors. Additionally, the sheer volume of people in crowded areas can make it challenging to quickly identify and respond to potential threats. The present disclosure addresses these challenges by leveraging advanced technologies such as imaging sensors and machine learning algorithms. By continuously monitoring the area, identifying suspicious individuals and objects, analyzing behavioral patterns, and determining threat locations in real-time, the disclosure provides a proactive approach to security. This allows for faster threat detection, early intervention, and more effective responses to potential security risks in crowded environments.

U.S. Pat. No. 11,735,018B2 discloses an intelligent face recognition system specifically designed for a security setup that includes an enrolment and reporting device with a first camera for enrolling faces, multiple remote second cameras for monitoring an environment, and a local or remote video processor with a face recognition engine. This system is tailored to recognize faces based on user-defined rules related to the order or time sequence of identification. This system focuses on recognizing enrolled faces other than the first user, generating alerts based on recognition events, and applying machine learning to analyze the imagery received from the cameras.

In Contrast to U.S. Pat. No. 11,735,018B2, the present disclosure describes a broader system aimed at proactive real-time threat detection in crowded areas. This system comprises a processor and memory with executable instructions to capture images and video feeds using multiple imaging sensors within a predefined area. The present disclosure identifies suspected individuals based on a watch list, detects suspicious objects, and analyses behavioral patterns using machine learning. The system classifies behaviors as suspicious or non-suspicious, identifies potential threats based on these classifications, and determines the precise location of these threats. Notifications, including detailed threat information, are then transmitted to authorities. U.S. Pat. No. 11,735,018B2 is discloses specifically about face recognition and alert generation based on predefined user rules within a specific monitored environment, while the present disclosure encompasses a comprehensive threat detection approach in crowded public areas, addressing various security threats, and providing detailed threat information to authorities for proactive response.

US20230186741A1 describes a security system that monitors the behavior of individuals in a series of images captured by a surveillance camera. The system includes a memory to store these images and a processor to analyze them. The processor performs two main tasks: tracking individuals over time by identifying them based on their image data and determining suspicious behavior if the tracking process fails. The system can store a template image for comparison, use a neural network model for identification, and manage occlusions and failure conditions. Additionally, it can send notifications when suspicious behavior is detected. The corresponding method and program for executing these tasks on a computer are also outlined.

In contrast to US20230186741A1, the present disclosure outlines a system designed to detect real-time threats in crowded areas using a processor and memory. This system captures images and video feeds through multiple sensors within a predefined area containing numerous individuals. The present disclosure identifies suspected individuals by comparing their profiles with a watch list using a machine learning model and detects suspicious objects. The system also analyzes behavioral patterns of individuals, classifying them as suspicious or non-suspicious, and identifies threats based on the suspected individuals, objects, and behaviors. The present disclosure determines the precise location of threats and transmits notifications to authorities, including details about the threat and visual evidence. US20230186741A1's primary concern is with tracking individuals and detecting suspicious behavior within a sequence of images from a surveillance camera, emphasizing the continuity of tracking and failure conditions in identification. In contrast, the present disclosure encompasses a broader scope, focusing on real-time threat detection in crowded areas using multiple sensors and machine learning to analyze individual behaviors, objects, and patterns. The present disclosure also includes a more comprehensive approach to identifying and locating threats and notifying authorities.

US20150213306A1 discloses an alarm apparatus, method, and system designed to detect questionable persons using wearable accessories like eyeglasses or belts. This system includes a camera to capture scenes behind the user, a GPS unit to determine the user's location, a storage unit for storing images of dangerous faces, and a control unit that employs facial recognition technology. The control unit monitors the duration for which a human face appears in the captured scenes and marks a face as dangerous if it exceeds a predetermined time threshold. The system stores the image and sends an alarm notification to the user, upon identifying a dangerous face. Additionally, if the distance of the dangerous face increases beyond a specified threshold, it transmits the image and user's location to local police. In contrast, the present disclosure outlines a system aimed at proactively detecting threats in crowded areas using multiple imaging sensors. This system consists of a processor and memory with executable instructions to capture real-time images and video feeds from predefined areas containing many individuals. The present disclosure identifies suspected individuals by comparing captured data with a watch list database using a machine learning model. The system also identifies suspicious objects and behavioral patterns, classifying behaviors as either suspicious or non-suspicious. Threat identification is based on the detected individuals, objects, and behaviors, followed by determining the precise location of these threats and notifying authorities with relevant information, including images, video feeds, and locations. US20150213306A1 discloses a personal wearable device for detecting questionable individuals behind a user, using facial recognition and GPS to alert the user and authorities if a threat is detected. The present disclosure targets threat detection in crowded public areas, utilizing machine learning to analyze images, video feeds, objects, and behaviors, providing comprehensive threat identification and location information to authorities.

U.S. Pat. No. 11,804,076B2 outlines an alarm apparatus and method specifically designed for a user, potentially wearable, to detect and respond to suspicious persons following or lingering behind the user. The system includes a camera to capture scenes behind the user, a GPS unit to determine the user's location and a storage unit for storing images of dangerous individuals. A control unit performs facial recognition, records the duration a person appears in the scene, and flags individuals as dangerous if they remain for too long. If the distance of a flagged individual changes significantly, the system alerts the user and transmits the information to the local police. The detection is based on the size of the face in the image, measured by the bounding box, and changes in distance are evaluated based on predetermined thresholds, such as doubling within a specified time frame. In contrast to U.S. Pat. No. 11,804,076B2, the present disclosure describes a system designed to detect threats in crowded areas, leveraging a network of imaging sensors to capture real-time images and video feeds. This system employs a processor and memory to analyze the data using machine learning models. The present disclosure identifies suspected individuals by comparing captured images with a database of profiles on watch lists and detects suspicious objects. Additionally, it monitors behavioral patterns of individuals and classifies them as suspicious or non-suspicious. The system determines threats based on suspicious individuals, objects, and behaviors, pinpoints their locations, and notifies authorities with detailed information, including precise locations and relevant images or videos. U.S. Pat. No. 11,804,076B2 focuses on a personal, wearable device for individual safety by monitoring scenes behind a user and alerting authorities if a threat is detected based on facial recognition and tracking duration. In contrast the present disclosure describes a more comprehensive, area-wide surveillance system for crowded spaces, utilizing machine learning to identify threats through behavior analysis and object detection, providing detailed threat information to authorities.

As a result, there is a need of a system, method, and device to proactively detect in real time one or more threats in crowded areas.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a system that includes an application server, a database server, an imaging device, and a communication network configured for threat detection and prevention in crowded areas.

The present disclosure presents a comprehensive system, method, and imaging device designed to proactively detect threats in crowded areas in real-time. Leveraging advanced technologies such as imaging sensors and machine learning models, the present disclosure addresses the limitations of traditional security measures by providing a scalable, efficient, and automated solution for threat detection and response. The system captures images and video feeds in real-time using a network of imaging sensors strategically positioned within a predefined area where a plurality of individuals is present. The system identifies one or more suspected individuals from the crowd, enabling targeted monitoring and intervention, utilizing a machine learning model and a database of user profiles corresponding to individuals on watch lists. The system also identifies suspicious objects within the captured images and video feeds, enhancing threat detection capabilities and enabling timely responses to potential security risks. The system analyzes behavioral patterns exhibited by individuals in the crowded area, distinguishing between suspicious and non-suspicious behaviors, employing machine learning algorithms. The system identifies potential threats and accurately determines their precise location within the crowded area, by combining information about suspected individuals, suspicious objects, and behavioral patterns. The system transmits real-time notifications to relevant authorities, providing them with crucial information such as threat location, suspected individuals, suspicious objects, and behavioral patterns, enabling swift and effective response measures, upon detecting a threat. The system employs advanced encryption techniques to protect individual identities and ensures compliance with privacy regulations in crowded areas, to address privacy concerns. The machine learning model dynamically adjusts its parameters based on crowd density, complexity of the environment, and background noise, enhancing its adaptability and accuracy in threat detection. The system optimizes computational resources using techniques such as reinforcement learning and hardware acceleration, enabling efficient processing of large volumes of data in real-time and scalability to accommodate varying crowd densities and security priorities.

According to embodiments illustrated herein, there may be provided a system to proactively detect in real time one or more threats in crowded areas. The system comprises a processor; and a memory communicatively coupled to the processor. Further, the memory stores processor-executable instructions, which, on execution, causes the processor to capture in real time at least one of a plurality of images and a plurality of video feed using a plurality of imaging sensors within a pre-defined area. In an embodiment, within the pre-defined area a plurality of individuals is present. The system is configured to identify one or more suspected individuals from the plurality of individuals based on a comparison with a database comprising one or more user profiles using a machine learning model. In an embodiment, the one or more user profiles correspond to individuals on a watch list of one or more authorities. The system is configured to identify one or more suspicious objects within the at least one of the plurality of images and the plurality of video feed. The system is configured to identify one or more behavioral patterns associated with each of the plurality of individuals using the machine learning model. The system is configured to classify the one or more behavioral patterns into one of a suspicious behavior and a non-suspicious behavior. The system is configured to identify the one or more threats based on at least one of the identified one or more suspected individuals, the identified one or more suspicious objects, and the identified one or more behavioral patterns. The system is configured to determine a precise location of the identified one or more threats. The system is configured to transmit a notification of the identified one or more threats to the one or more authorities. In an embodiment, the notification comprises at least one of the precise locations of the threat, the identified one or more suspected individuals, the identified one or more suspicious objects, and the identified one or more behavioral patterns, and the plurality of images and the plurality of video feed.

According to embodiments illustrated herein, there may be provided a method for proactively detecting in real time one or more threats in crowded areas. The method may be implemented by a processor of an imaging device. The method comprises capturing in real time at least one of a plurality of images and a plurality of video feed using a plurality of imaging sensors within a pre-defined area. In an embodiment, within the pre-defined area a plurality of individuals is present. The method comprises identifying one or more suspected individuals from the plurality of individuals based on a comparison with a database comprising one or more user profiles using a machine learning model. In an embodiment, the one or more user profiles correspond to individuals on a watch list of one or more authorities. The method comprises identifying one or more suspicious objects within the at least one of the plurality of images and the plurality of video feed. The method comprises identifying one or more behavioral patterns associated with each of the plurality of individuals using the machine learning model. The method comprises classifying the one or more behavioral patterns into one of a suspicious behavior and a non-suspicious behavior. The method comprises identifying the one or more threats based on at least one of the identified one or more suspected individuals, the identified one or more suspicious objects, and the identified one or more behavioral patterns. The method comprises determining a precise location of the identified one or more threats. The method comprises transmitting a notification of the identified one or more threats to the one or more authorities. In an embodiment, the notification comprises at least one of the precise locations of the threat, the identified one or more suspected individuals, the identified one or more suspicious objects, and the identified one or more behavioral patterns, and the plurality of images and the plurality of video feed.

According to embodiments illustrated herein, there may be provided an imaging device to proactively detect in real time one or more threats in crowded areas. The imaging device comprises a processor; and a memory communicatively coupled to the processor, wherein the memory stores processor-executable instructions, which, on execution, causes the processor to capture in real time at least one of a plurality of images and a plurality of video feed using a plurality of imaging sensors within a pre-defined area. In an embodiment, within the pre-defined area a plurality of individuals is present. The imaging device is configured to identify one or more suspected individuals from the plurality of individuals based on a comparison with a database comprising one or more user profiles using a machine learning model. In an embodiment, the one or more user profiles correspond to individuals on a watch list of one or more authorities. The imaging device is configured to identify one or more suspicious objects within the at least one of the plurality of images and the plurality of video feed. The imaging device is configured to identify one or more behavioral patterns associated with each of the plurality of individuals using the machine learning model. The imaging device is configured to classify the one or more behavioral patterns into one of a suspicious behavior and a non-suspicious behavior. The imaging device is configured to identify the one or more threats based on at least one of the identified one or more suspected individuals, the identified one or more suspicious objects, and the identified one or more behavioral patterns. The imaging device is configured to determine a precise location of the identified one or more threats. The imaging device is configured to transmit a notification of the identified one or more threats to the one or more authorities. In an embodiment, the notification comprises at least one of the precise locations of the threat, the identified one or more suspected individuals, the identified one or more suspicious objects, and the identified one or more behavioral patterns, and the plurality of images and the plurality of video feed.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 3 is a flowchart that illustrates a method to proactively detect in real time one or more threats in crowded areas, in accordance with an embodiment of present disclosure.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The objectives of the present disclosure are multifaceted, aiming to address various technical challenges and enhance security measures in crowded areas. It is an objective of the present disclosure to detect potential threats in crowded areas in real-time, enabling authorities to identify and respond to security risks promptly. Another objective of the present disclosure is to automate surveillance processes, reducing reliance on manual monitoring and improving overall efficiency. Yet another objective of the present disclosure is to enable targeted monitoring of suspected individuals and suspicious objects within crowded areas, enhancing the effectiveness of security measures and minimizing false alarms. Yet another objective of the present disclosure is to differentiate between suspicious and non-suspicious behaviors exhibited by individuals in crowded areas, improving threat detection accuracy and reducing false positives. One another objective of the present disclosure is to address privacy concerns. The present disclosure incorporates advanced encryption techniques to protect individual identities and ensure compliance with privacy regulations while still enabling effective threat detection.

Figure 1:
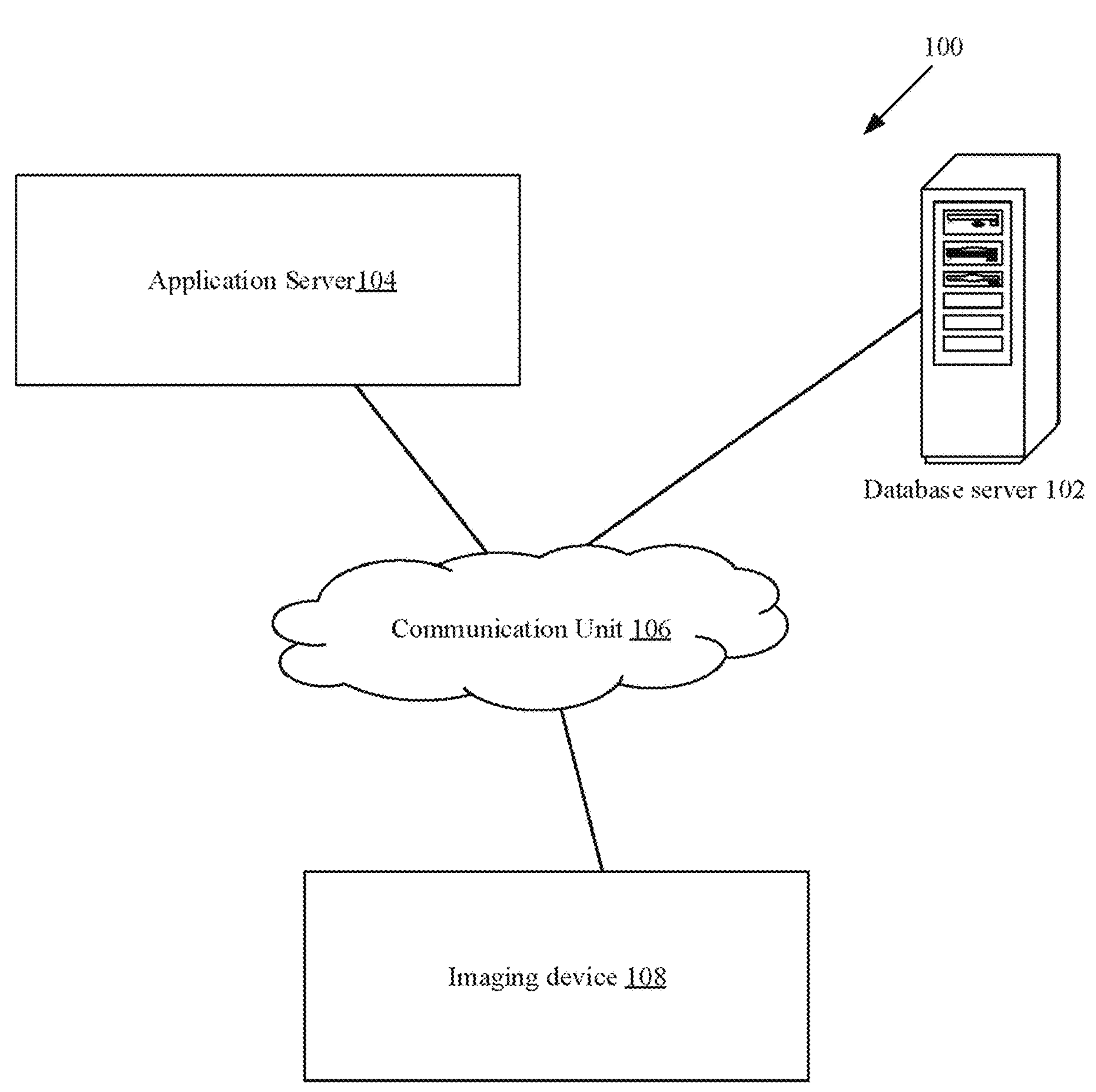
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 typically includes an application server 102, a database server 104, a communication network 106, and a plurality of imaging devices 108 which are part of a system environment 100 to proactively detect in real time one or more threats in crowded areas. The application server 102, the database server 104, and the plurality of imaging devices 108 are typically communicatively coupled with each other via the communication network 106. In an embodiment, the application server 104 may communicate with the database server 102, and the plurality of imaging devices 108 using one or more protocols such as, but not limited to, Open Database Connectivity (ODBC) protocol and Java Database Connectivity (JDBC) protocol.

The database server 102 serves as the backbone of modern information systems, providing a centralized platform for storing, managing, and retrieving data efficiently. The database server 102 encompasses various components and functionalities to support the storage, retrieval, and manipulation of data while ensuring security, reliability, and performance. At its core, a database server 102 consists of a Database Management System (DBMS) running on specialized hardware or virtualized environments. The DBMS facilitates interactions with the database, allowing users or applications to perform operations such as data insertion, retrieval, modification, and deletion. Data is stored on storage devices, including hard disk drives (HDDs), optical drives, solid-state drives (SSDs), or cloud storage, managed by the server. These devices provide the physical or virtual space required to store large volumes of structured or unstructured data. The processor and memory of the server handle data processing tasks, executing queries, and performing data manipulations efficiently. A robust network interface enables communication between the database servers 102 and other devices or applications within the network, facilitating data transfer and access.

Database server 102 administrators (DBAs) play a crucial role in managing and maintaining database servers. They are responsible for configuring, monitoring, and optimizing the server to ensure optimal performance, security, and availability. This includes implementing backup and recovery strategies, optimizing performance through indexing and query optimization, and ensuring data integrity and security through authentication, authorization, and encryption mechanisms.

In the present disclosure for proactively detecting threats in crowded areas, the database server 102 serves as a critical component for storing and managing important data related to individuals, suspicious objects, and behavioral patterns. The database server 102 stores a user profiles database, which contains information about individuals who are on watch lists maintained by authorities. These user profiles include identifying information such as names, contact information, past criminal records, photographs, biometric data, and other relevant details. The database server 102 ensures the efficient storage and retrieval of this information, facilitating rapid comparison with real-time observations.

The database server 102 also serves as a repository for historical data related to past incidents, threat alerts, and security events. This historical data can be valuable for trend analysis, pattern recognition, and refining the machine learning models used for threat detection. By securely storing this data, the database server 102 enables the system to learn from past experiences and improve its effectiveness over time. The database server 102 allows for the management and updating of watch lists by authorized personnel. New individuals deemed as potential threats can be added to the watch list, while outdated or irrelevant entries can be removed or updated. This ensures that the system has access to the latest information necessary for accurate threat detection. The database server 102 provides seamless integration with the machine learning models responsible for comparing real-time observations with the information stored in the user profiles database. The database server 102 implements security measures such as access controls, encryption, and data backup mechanisms, to safeguard the confidentiality, integrity, and availability of the stored data. This helps prevent unauthorized access, tampering, or loss of sensitive information, ensuring compliance with privacy regulations and security standards. The database server 102 is designed to be highly reliable and fault-tolerant, minimizing the risk of downtime or data loss. Redundancy measures such as data replication, failover mechanisms, and automated backups are implemented to ensure continuous operation and data integrity.

The application server 104 serves as a central hub where all the processing and analysis take place. The application server 104 hosts the processor and memory units necessary for executing the processor-executable instructions stored in memory. Application server 104 manages the flow of data coming from the imaging sensors, which capture real-time images and video feeds from the crowded areas. These data streams are sent to the application server 104 for processing and analysis. The application server 104 executes the machine learning model responsible for identifying suspected individuals, detecting suspicious objects, and analyzing behavioral patterns. This model leverages the processor's substantial computational power to perform complex computations required for real-time threat detection. In an embodiment, the machine learning model may utilize certain deep learning techniques, supervised learning techniques, semi-supervised learning techniques and the like. In a working example, machine learning models, such as those developed through TensorFlow or PyTorch systems, may be implemented in the application server 104. The application server 104 identifies potential threats within the crowded areas using the results generated by the machine learning model. The application server 104 identifies and correlates information about suspected individuals, suspicious objects, and behavioral patterns to determine the level of threat. The application server 104 utilizes geo-positioning techniques to determine the precise location of identified threats within the predefined area. This information is crucial for directing security personnel to the exact location of the threat. The latest advancements in computational power are marked by the development of new chips capable of performing trillions of computations per second. These high-performance processors, leveraging innovative architectures and semiconductor technologies, are revolutionizing fields such as artificial intelligence, scientific research, and real-time data processing, enabling unprecedented speeds and efficiencies in complex computational tasks.

The application server 104 is responsible for transmitting notifications to relevant authorities. These notifications contain detailed information about the threat, including precise location, suspected individuals, suspicious objects, and behavioral patterns. This facilitates prompt and targeted response by law enforcement agencies or security personnel. The application server 104 ensures the security and privacy of sensitive data by encrypting images, video feeds, and other information using advanced encryption techniques. This protects individual identities and ensures compliance with privacy regulations.

The communication network 106 serves as the backbone for transmitting data, alerts, and notifications between various components of the system. The communication network 106 enables the transfer of real-time data captured by imaging sensors, such as images and video feeds, from the crowded areas to the central processing units, including the application server 104 and the database server 102. This ensures that relevant data is promptly delivered for analysis and decision-making. The communication network 106 facilitates the transmission of alerts and notifications to relevant authorities, security personnel, or other stakeholders, once a threat is identified. These notifications contain crucial information about the nature of the threat, its precise location, and any associated individuals or objects of interest. By quickly disseminating this information, the communication network 106 helps expedite response times and mitigate potential risks. The communication network 106 enables seamless interaction between these components, allowing for the exchange of commands, data queries, and status updates. This ensures that the system operates cohesively and responds effectively to evolving security situations. The communication network 106 incorporates redundancy measures such as multiple communication channels, failover mechanisms, and backup routes, to ensure reliability and resilience. This helps mitigate the risk of network failures or disruptions, ensuring continuous operation even in adverse conditions or in the event of equipment malfunctions.

The communication network 106 employs robust security measures to protect against unauthorized access, interception, or tampering, given the sensitive nature of the data being transmitted. The communication network 106 also facilitates integration with external systems or third-party services, such as emergency response systems, law enforcement databases, or public alerting platforms. This interoperability allows for seamless information sharing and collaboration across multiple stakeholders, enhancing overall situational awareness and response coordination.

In an embodiment, the communication network 106 may correspond to a communication medium through which the database server 102, the application server 104, and the plurality of imaging devices 108 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared IR), IEEE 802.11, 802.16, 2G, 3G, 4G, 5G, 6G cellular communication protocols, satellite communication and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The plurality of imaging devices 108 serve as the frontline sensors responsible for capturing real-time images and video feeds within the predefined areas. The plurality of imaging devices 108 including both cameras and drones are equipped with imaging sensors, which continuously monitor crowded areas to capture visual data in real-time. The plurality of imaging devices 108 provide a comprehensive view of the environment, allowing for continuous surveillance and monitoring of potential threats. The system ensures comprehensive coverage and surveillance, by strategically positioning the plurality of imaging devices 108 in key locations within crowded areas. Fixed cameras are deployed to cover specific areas of interest, while drones equipped with imaging sensors can provide dynamic coverage and capture images from various perspectives. The plurality of imaging devices 108 are equipped with high-resolution cameras capable of capturing detailed images and video feeds. This ensures that even small or distant objects can be captured with sufficient clarity for threat detection and analysis. Some imaging devices 108 feature pan-tilt-zoom (PTZ) functionality, allowing operators to remotely adjust the camera's orientation and zoom level. This flexibility enables operators to focus on specific areas of interest or individuals within crowded spaces, enhancing the system's responsiveness to potential threats. The images and video feeds captured by imaging devices are fed into the system's machine learning models for analysis and threat detection. These models utilize computer vision algorithms to identify suspicious individuals, detect suspicious objects, and analyze behavioral patterns within the crowded areas. Imaging devices 108 are configured to comply with privacy regulations and standards, to address privacy concerns. Advanced encryption techniques may be employed to protect the privacy of individuals captured in the images and video feeds, ensuring that sensitive information is safeguarded. Imaging devices 108 are designed to operate effectively under various environmental conditions, including different lighting conditions, weather conditions, and levels of crowd density. This adaptability ensures that the system can maintain surveillance and threat detection capabilities regardless of external factors. The deployment of multiple imaging devices across various geographic locations is a critical aspect of modern data acquisition systems. These imaging devices, whether they are satellites, drones, or ground-based sensors, are all interconnected through advanced networking technologies. This networked configuration allows them to transmit data in real-time to a central application server via robust communication channels. The central server then aggregates and processes this influx of data, ensuring comprehensive and synchronized monitoring across all locations, thereby enhancing the accuracy and efficiency of the system's operations.

In an embodiment, the system environment may comprise cluster computing in the proposed system by providing the necessary computational power and scalability to process vast amounts of data in real time. By distributing the computational load across multiple nodes in a cluster, the system can handle the intensive processing required for analyzing multiple video feeds simultaneously. Each node in the cluster can process a subset of the data, ensuring that the system can scale to monitor large and crowded areas without performance degradation. Further, cluster computing ensures that the workload is balanced across all available nodes, preventing any single node from becoming a bottleneck. This balanced approach enhances the system's efficiency and reliability, ensuring continuous operation even during peak times or high traffic scenarios.

The system may further dynamically scale its resources based on real-time demands. During high traffic periods or events, additional nodes can be added to the cluster to handle the increased data load, ensuring that the system maintains real-time threat detection capabilities. Further, as the area to be monitored expands, new nodes can be added to the cluster without disrupting the existing system. This horizontal scalability makes the system adaptable to various sizes of crowded environments, from small venues to large urban areas.

Additionally, cluster computing provides redundancy by replicating data and processes across multiple nodes. In the event of a node failure, other nodes can take over the processing tasks, ensuring uninterrupted operation and continuous threat monitoring. Thus, the system incorporates failover mechanisms to automatically detect and recover from hardware or software failures, enhancing the reliability and resilience of the threat detection system. Also, high-speed networking within the cluster ensures low latency communication between nodes, enabling rapid data exchange and real-time collaborative processing of video feeds and sensor data.

Further in an embodiment, training advanced machine learning models for threat detection requires significant computational resources. Cluster computing enables distributed training of these models across multiple nodes, reducing training times and improving the accuracy of the models by utilizing larger datasets. Once trained, these models can be deployed across the cluster for real-time inference. Each node can perform model inference on its subset of data, ensuring that the system can analyze and detect threats quickly and accurately. Thus, by leveraging the power of cluster computing, the proposed system achieves the scalability, efficiency, and robustness required to proactively detect threats in real-time within crowded areas, enhancing public safety and security.

Figure 2:
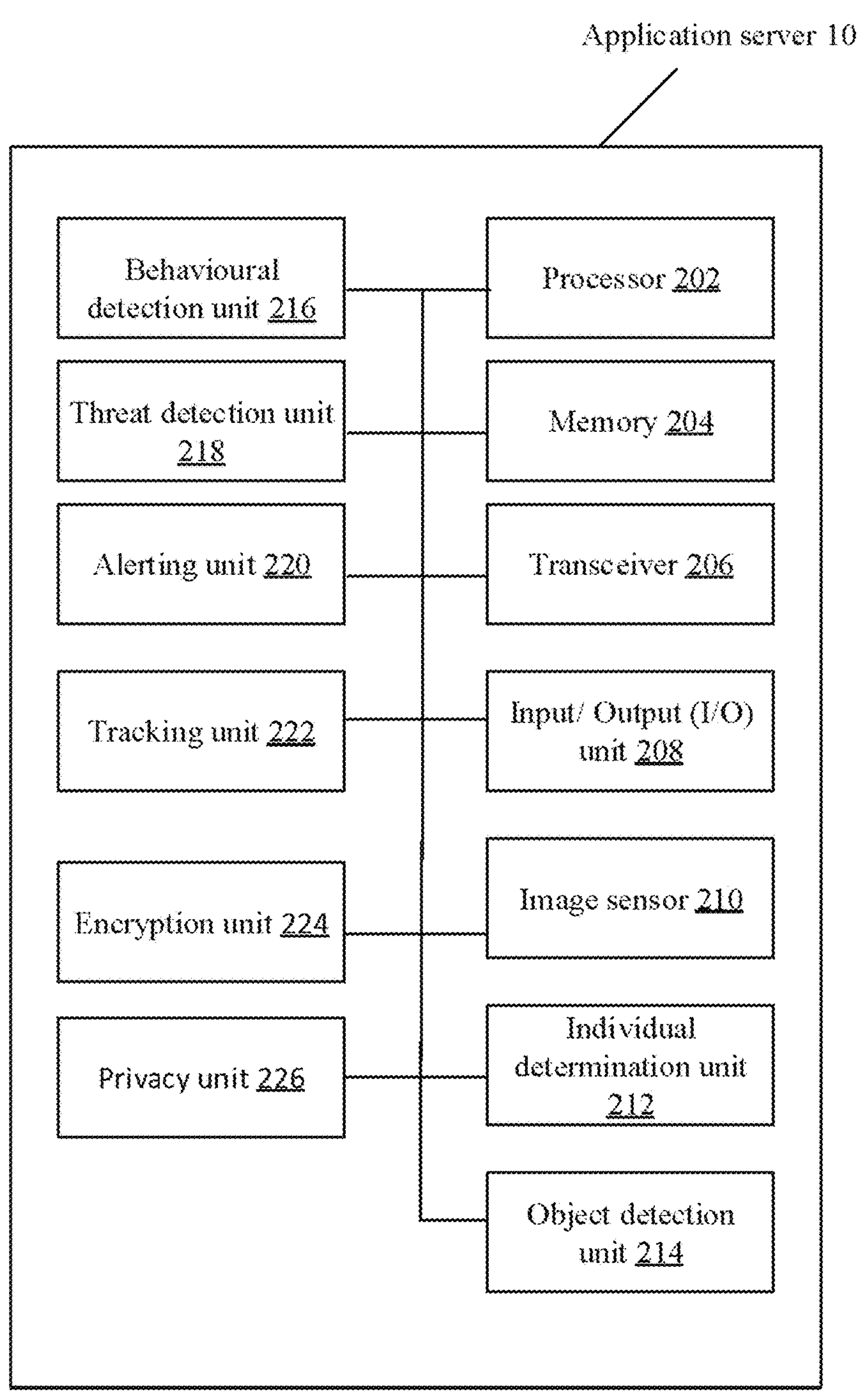
FIG. 2 is a block diagram that illustrates an application server configured to proactively detect in real time one or more threats in crowded areas, in accordance with an embodiment of present disclosure.

FIG. 2 is a block diagram that illustrates an application server 104 configured to proactively detect in real time one or more threats in crowded areas, in accordance with an embodiment of present disclosure. FIG. 2 is explained in conjunction with elements from FIG. 1. Here, the application server 104 preferably includes a processor 202, a memory 204, a transceiver 206, an input/output unit 208, an image sensor or sensors or sensors 210, an individual determination unit 212, an object detection unit 214, a behavioral detection unit 216, a threat detection unit 218, an alerting unit 220, a tracking unit 222, an encryption unit 224 and a privacy unit 226. The processor 202 is further preferably communicatively coupled to the memory 204, the transceiver 206, the input/output unit 208, the image sensor or sensors 210, the individual determination unit 212, the object detection unit 214, the behavioral detection unit 216, the threat detection unit 218, the alerting unit 220, the tracking unit 222, the encryption unit 224 and the privacy unit 226, while the transceiver 206 is preferably communicatively coupled to the communication network 106.

The processor 202 comprises suitable logic, circuitry, interfaces, and/or code that may be configured to execute a set of instructions stored in the memory 204, and may be implemented based on several processor technologies known in the art. The processor 202 works in coordination with the transceiver 206, the input/output unit 208, the image sensor or sensors 210, the individual determination unit 212, the object detection unit 214, the behavioral detection unit 216, the threat detection unit 218, the alerting unit 220, the tracking unit 222, the encryption unit 224 and the privacy unit 226 for proactively detecting in real time one or more threats in crowded areas. Examples of the processor 202 include, but not limited to, an X86-based processor, a Reduced Instruction Set Computing (RISC) processor, an Application-Specific Integrated Circuit (ASIC) processor, and a Complex Instruction Set Computing (CISC) processor, for example.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be implemented based on a Random Access Memory (RAM), a Read-Only Memory (ROM), a Hard Disk Drive (HDD), a storage server, and/or a Secure Digital (SD) card.

Transceiver 206 serves as a communication interface that enables the exchange of data, signals, or information between different system components over a wireless or wired network. In the context of the threat detection system, transceivers enable wireless communication between key components such as imaging devices, processing units, application servers, and database servers. They utilize wireless communication protocols such as Wi-Fi, Bluetooth, ZigBee, satellite, or cellular networks to transmit data and signals over short or long distances. Transceivers 106 transmit data captured by imaging devices, such as images and video feeds, to processing units for analysis and threat detection. They also facilitate the transmission of alerts, notifications, and commands between various system components, enabling seamless coordination and response. In addition to transmitting data, transceivers receive incoming data, commands, and instructions from other system components. This bi-directional communication capability allows for real-time interaction and control, enabling operators to remotely monitor and manage the system.

Transceivers 106 are integrated into imaging devices such as cameras and drones to enable wireless communication capabilities. This integration allows imaging devices to transmit captured data to processing units or application servers for analysis and processing. Transceivers 106 are designed to provide reliable communication even in challenging environments characterized by interference, noise, or signal attenuation. They incorporate error correction techniques, signal modulation schemes, and adaptive transmission protocols to ensure robust and resilient communication. Transceivers minimize communication latency by prioritizing the transmission of critical data and signals, to support real-time applications such as threat detection. The low-latency communication by the transceivers ensures timely delivery of information, enabling rapid decision-making and response to emerging threats. Transceivers 106 are scalable and flexible, allowing for easy integration with existing infrastructure and compatibility with a wide range of communication protocols and standards. This scalability enables the system to expand and adapt to evolving requirements and technological advancements over time. Transceivers 106 optimize power consumption to prolong battery life and minimize energy consumption, particularly in battery-operated devices such as drones or portable imaging units. Power-saving features such as sleep modes, dynamic power management, and energy-efficient protocols are employed to maximize operational efficiency. Transceivers 106 incorporates security features such as encryption, authentication, and secure communication protocols to protect data integrity and confidentiality. These security measures help prevent unauthorized access, eavesdropping, and tampering, ensuring the privacy and security of transmitted data.

The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. Also, the transceiver 206 may communicate via wireless communication with networks, such as the Internet, an Intranet, and/or a wireless network, such as a cellular telephone network, a wireless local area network (LAN) and/or a metropolitan area network (MAN). Accordingly, the wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VOIP), Wi-MAX, a protocol for email, instant messaging, and/or Short Message Service (SMS).

The input/output unit 208 comprises suitable logic, circuitry, interfaces, and/or code that may be configured to provide one or more inputs for proactively detecting in real time one or more threats in crowded areas. The input/output unit 208 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The image sensors 210 are pivotal components responsible for capturing visual data within predefined areas. An image sensor or sensors 210 is a device that converts optical images into electronic signals. An image sensor or sensors 210 serves as the "eye" of the system, capturing visual information in the form of images or video feeds. Image sensors 210 are typically found in cameras, drones, and other imaging devices used for surveillance and monitoring applications. Image sensors 210 capture visual data within crowded areas by detecting light and converting it into digital signals. They consist of an array of photosensitive pixels that detect variations in light intensity and color, producing an electronic representation of the scene being observed. The image sensors 210 come in various types, including charge-coupled devices (CCDs) and complementary metal-oxide-semiconductor (CMOS) sensors. Both types have their advantages and are suitable for different applications. CMOS sensors are more commonly used in modern imaging devices due to their lower power consumption, faster readout speeds, and integration with on-chip processing capabilities. The image sensors 210 vary in resolution, which determines the level of detail captured in the resulting images. Higher resolution image sensors 210 capture more detail but may require more processing power and storage capacity. Image quality is also influenced by factors such as sensor size, pixel size, and sensitivity to light, all of which contribute to the clarity and fidelity of the captured images. The dynamic range of an image sensor or sensors 210 refers to its ability to capture both bright and dark areas within a scene while preserving detail and contrast. Image sensors 210 with high dynamic range are capable of capturing scenes with a wide range of lighting conditions, making them well-suited for surveillance applications in crowded areas where lighting conditions may vary.

Image sensors 210 are integrated into various imaging devices used for surveillance and monitoring in crowded areas. These devices include fixed cameras deployed in strategic locations, as well as drones equipped with cameras for aerial surveillance. Image sensors 210 capture visual data in real-time, which is then transmitted to processing units for analysis and threat detection. The image sensors are designed to operate effectively under different environmental conditions, including varying light levels, weather conditions, and levels of crowd density. They may feature technologies such as infrared sensitivity or image stabilization to enhance performance in challenging environments. In the context of surveillance applications, image sensors 210 must adhere to privacy regulations and standards. Measures such as pixilation, masking, or encryption may be employed to protect the privacy of individuals captured in the images or video feeds, ensuring compliance with privacy laws and regulations. Giga-pixel imaging devices represent a groundbreaking advancement in photographic technology, capable of capturing images with resolutions in the order of billions of pixels. Unlike traditional imaging devices, which typically capture images in the range of millions of pixels, giga-pixel cameras offer exponentially higher resolution. This dramatic increase in pixel density allows these devices to capture incredibly detailed images, capable of revealing minute details from vast distances.

The key difference lies in resolution. While a standard camera might capture a scene with sufficient detail for everyday use, a giga-pixel camera can capture the same scene with such precision that even the smallest features, which would be indistinguishable from regular cameras, are visible. This capability is revolutionary, as it allows for detailed surveillance, mapping, and scientific research from many yards away. The ability to capture such high-resolution images from significant distances is crucial for applications requiring precision and detail, such as remote sensing, environmental monitoring, and security operations.

The Individual Determination Unit (IDU) 212 may include suitable logic, circuitry, interfaces, and/or code that may be configured to serve as a core component responsible for identifying and analyzing individuals within the monitored area. The Individual Determination Unit (IDU) 212 is a specialized module within the system architecture tasked with identifying and determining the characteristics of individuals present in the monitored area. It utilizes advanced algorithms and machine learning techniques to analyze visual data captured by imaging sensors and extract relevant information about individuals within crowded spaces. The IDU 212 performs image processing and analysis on the visual data captured by imaging sensors, including still images and video feeds. It employs computer vision algorithms and machine learning techniques to detect and recognize individuals within the images, even in crowded or complex scenes. One of the primary functions of the IDU 212 is facial recognition, which involves identifying and matching individuals based on their facial features. The IDU 212 compares the facial characteristics of individuals detected in the visual data with known reference images stored in a database, such as watch lists maintained by authorities. This enables the IDU to identify individuals of interest and flag them for further scrutiny. In addition to facial recognition, the IDU may analyze other biometric data such as gait analysis, body posture, or clothing characteristics to further refine individual identification. By combining multiple biometric modalities, the IDU enhances the accuracy and reliability of individual determination, even in challenging scenarios or when facial features are obscured. The IDU may also perform behavioral analysis using data and pattern input, to assess the actions and movements of individuals within the monitored area, beyond static identification. The IDU can detect suspicious behaviors, anomalies, or deviations from normal patterns, which may indicate potential threats or security concerns. Behavioral analysis adds an additional layer of context to individual determination, enabling the system to proactively identify and respond to emerging threats.

The IDU 212 incorporates privacy-preserving measures such as anonymization, de-identification, or encryption of sensitive data, to address privacy concerns. It ensures that individual identities are protected and that personal information is handled in compliance with privacy regulations and ethical standards. The IDU 212 seamlessly integrates with other components of the threat detection system, such as the application server and communication network. It provides real-time insights and alerts about individuals of interest, suspicious behaviors, or potential threats, enabling timely response and intervention by security personnel or authorities.

The Object Detection Unit (ODU) 214 may include suitable logic, circuitry, interfaces, and/or code that may be configured to serve as a crucial component responsible for identifying and analyzing suspicious objects within the monitored environment. The Object Detection Unit (ODU) 214 is a specialized module within the system architecture tasked with detecting and analyzing objects of interest within crowded areas. The ODU 214 utilizes advanced algorithms and computer vision techniques to identify objects that may pose a threat to security or safety. The ODU employs state-of-the-art object detection algorithms, such as YOLO (You Only Look Once), SSD (Single Shot MultiBox Detector), or Faster R-CNN (Region-based Convolutional Neural Network), to identify and localize objects within images or video feeds. These algorithms are trained on large datasets and can accurately detect a wide range of objects, including weapons of all types, suspicious packages, explosive devices, unattended luggage and other articles, or other potentially dangerous items. The ODU operates in real-time, continuously scanning images and video feeds captured by imaging sensors for the presence of suspicious objects. It can detect objects within crowded scenes, even in challenging conditions such as varying lighting, occlusions, or cluttered backgrounds.

In addition to detecting individual objects, the ODU 214 is capable of recognizing multiple object classes simultaneously. It can distinguish between different types of objects and prioritize the detection of objects that pose the highest security risk, such as firearms, explosives, suspicious packages, or hazardous materials. The ODU accurately localizes its position within the scene and tracks its movement over time once an object of interest is detected. This enables security personnel to locate the object, monitor the trajectory of the object, assess its threat level, and take appropriate action to mitigate the risk. The ODU 214 seamlessly integrates with other components of the threat detection system, such as the Individual Determination Unit (IDU) and the Behavioral Analysis Unit (BAU). It provides critical information about the presence of suspicious objects, which can be correlated with data about individuals and behavioral patterns to assess the overall security risk within the monitored area. The ODU generates alerts and notifications to alert security personnel or authorities. These alerts contain detailed information about the detected object, including its type, location, and any associated individuals or behaviors of interest. By providing timely and actionable intelligence, the ODU enables rapid response and intervention to mitigate potential threats. The ODU incorporates privacy-preserving measures such as anonymization or encryption of sensitive data, to address privacy concerns. It ensures that individuals' identities are protected while still enabling effective object detection and threat mitigation.

The Behavioral Detection Unit (BDU) 216 may include suitable logic, circuitry, interfaces, and/or code that may be configured to serve as a key component responsible for analyzing and identifying suspicious behaviors exhibited by individuals within the monitored environment. The Behavioral Detection Unit (BDU) 216 is a specialized module within the system architecture tasked with monitoring, analyzing, and identifying behavioral patterns exhibited by individuals in crowded areas. It employs advanced algorithms and machine learning techniques to detect deviations from normal behavior and flag activities that may indicate potential security threats or safety concerns. The BDU 216 utilizes sophisticated behavioral analysis algorithms to interpret human actions, movements, and interactions within the monitored environment. These algorithms leverage machine learning models trained on vast datasets of past normal and abnormal behaviors to identify patterns, anomalies, and indicators of suspicious activity.

The BDU 216 operates in real-time, continuously monitoring live video feeds and sensor data captured by imaging devices within the crowded areas. It analyzes the behavior of individuals within the scene, detecting subtle cues and patterns that may suggest heightened levels of alertness, aggression, or unusual activity. The BDU identifies and flags behaviors that deviate from established norms or baseline patterns, based on the analysis of behavioral data. These may include actions such as loitering in sensitive areas, erratic movements, unusual gestures, or attempts to conceal objects or identities. The BDU 216 provides early warning signs of potential security threats and triggers further investigation or intervention, by detecting such behaviors. The BDU seamlessly integrates with other components of the threat detection system, such as the Object Detection Unit (ODU) and the Individual Determination Unit (IDU). It correlates behavioral data with information about detected objects and identified individuals, providing a comprehensive understanding of the security situation within the monitored area. The BDU 216 is designed to be adaptable and capable of learning from past experiences and feedback. It continuously refines its behavioral analysis algorithms based on new data and insights, improving its ability to accurately detect and classify suspicious behaviors over time. The BDU incorporates privacy-preserving measures such as anonymization or encryption of sensitive data, to address privacy concerns.

Threat Detection Unit (TDU) 218 may include suitable logic, circuitry, interfaces, and/or code that may be configured to serve as a central component responsible for aggregating and analyzing data from various subsystems to identify potential security threats. The Threat Detection Unit (TDU) 218 is a core module within the system architecture tasked with analyzing data from multiple sources, including individual identification, object detection, behavioral analysis, and environmental sensors, to identify potential security threats within crowded areas. It serves as the central intelligence hub where data from different subsystems is aggregated, correlated, and analyzed to assess the overall security situation. The TDU 218 aggregates data from diverse sources, including the Individual Determination Unit (IDU), Object Detection Unit (ODU), Behavioral Detection Unit (BDU), and environmental sensors. It integrates data streams from these subsystems into a unified platform, enabling holistic analysis and correlation of information to identify potential threats. The TDU 218 performs multimodal threat analysis by combining data from various sources to assess the severity and credibility of potential threats. It correlates information about identified individuals, detected objects, and observed behaviors to evaluate the likelihood of a security incident and its potential impact on public safety. The TDU 218 assesses and prioritizes potential threats according to their severity, urgency, and proximity to critical assets or vulnerable populations, based on the analysis of aggregated data. It categorizes threats based on predefined risk levels and generates alerts or notifications to prompt appropriate response actions by security personnel or authorities. The TDU 218 operates in real-time, continuously monitoring incoming data streams for signs of potential threats. It employs advanced algorithms and machine learning techniques to detect anomalies, patterns, and indicators of suspicious activity, triggering timely alerts and notifications to alert security personnel or authorities. The TDU 218 seamlessly integrates with response systems, such as emergency dispatch services, law enforcement agencies, or on-site security personnel, to facilitate rapid response and intervention in the event of a security threat. The TDU 218 provides actionable intelligence and situational awareness to support decision-making and coordination of response efforts by utilizing the communication unit 106 for its communications.

The Tracking Unit (TU) 222 may include suitable logic, circuitry, interfaces, and/or code that may be configured to serve as a critical component responsible for monitoring the movement of individuals and objects within the monitored environment. The Tracking Unit (TU) is a specialized module within the system architecture tasked with monitoring and tracking the movement of individuals, objects, or other entities within crowded areas. It utilizes a combination of sensor data, image processing techniques, and tracking algorithms to maintain real-time situational awareness and accurately predict the trajectory of tracked entities. The TU 222 tracks the movement of both individuals and objects within the monitored environment. It continuously analyzes sensor data, such as video feeds from imaging devices or signals from proximity sensors, to determine the location, speed, and direction of movement of tracked entities. The TU 222 operates in real-time, providing continuous monitoring and tracking of entities within the crowded area. It updates the position and trajectory of tracked entities dynamically as new sensor data becomes available, ensuring accurate and up-to-date information for threat detection and response. The TU 222 is capable of simultaneously tracking multiple targets within the monitored area. It employs multi-target tracking algorithms, such as Kalman filters or particle filters, to associate observations from multiple sensors and maintain individual tracks for each detected entity. The TU 222 predicts future movements and trajectories of tracked entities based on historical data and motion models, in addition to tracking current positions. This predictive capability enables the system to anticipate the future behavior of individuals or objects and proactively respond to potential threats or security concerns.

The TU 222 seamlessly integrates with other components of the threat detection system, such as the Object Detection Unit (ODU), Individual Determination Unit (IDU), and Behavioral Detection Unit (BDU). The TU 222 provides critical tracking information about the movement of detected objects and individuals, enhancing the overall situational awareness and threat assessment capabilities of the system. The TU 222 accurately tracks the position and movement of entities, by utilizing technologies like GPS, LiDAR, and sonar. The TU 222 generates alerts and notifications to alert security personnel or authorities, when suspicious movements or deviations from normal behavior are detected. These alerts contain detailed information about the tracked entities, including their current position, trajectory, and any associated behaviors of interest, enabling prompt response and intervention.

The Encryption Unit 224 may include suitable logic, circuitry, interfaces, and/or code that may be configured to serve as a critical component responsible for safeguarding sensitive data and communications exchanged within the system. The Encryption Unit 224 is a specialized module within the system architecture tasked with encrypting sensitive data, including images, video feeds, and communication channels, to protect them from unauthorized access or interception. Encryption transforms plaintext data into ciphertext using cryptographic algorithms, rendering it unreadable to anyone without the appropriate decryption key. The Encryption Unit 224 encrypts sensitive data, such as images and video feeds captured by imaging sensors, to prevent unauthorized access or tampering. It employs strong encryption algorithms, such as Advanced Encryption Standard (AES) or RSA, to ensure the confidentiality and integrity of the data. The Encryption Unit also secures communication channels used for transmitting data between system components and external entities, in addition to encrypting data at rest. It employs secure communication protocols, such as Transport Layer Security (TLS) or Secure Socket Layer (SSL), to encrypt data in transit and protect it from eavesdropping or tampering.

The Encryption Unit 224 manages encryption keys used for encrypting and decrypting data. It ensures that encryption keys are securely generated, stored, and distributed to authorized entities while protecting them from theft or unauthorized disclosure. Key management practices, such as key rotation and key escrow, are implemented to enhance security and resilience against attacks. The Encryption Unit enables end-to-end encryption of data, ensuring that data remains encrypted throughout its lifecycle, from capture to storage and transmission. End-to-end encryption provides a high level of security and privacy, as only authorized entities with the decryption key can access the plaintext data. The Encryption Unit ensures compliance with privacy regulations and standards governing the protection of sensitive data, such as the General Data Protection Regulation (GDPR) or the Health Insurance Portability and Accountability Act (HIPAA). It implements encryption as a fundamental security measure to mitigate the risk of data breaches and ensure privacy compliance. The Encryption Unit is designed to be interoperable and compatible with other system components and external entities. It ensures that encrypted data can be securely exchanged and accessed by authorized parties, regardless of the underlying hardware or software platforms. The Encryption Unit optimizes encryption and decryption processes to minimize overhead and latency while maintaining strong security and protection against hacking and other cyber threats. It leverages hardware acceleration technologies, such as cryptographic coprocessors or secure enclaves, to offload encryption tasks and improve system performance.

The Privacy Unit 226 may include suitable logic, circuitry, interfaces, and/or code that may be configured to serve as a vital component responsible for ensuring the protection of individuals' privacy rights while still enabling effective threat detection and response. The Privacy Unit 226 is a specialized module within the system architecture tasked with implementing privacy-preserving measures to safeguard individuals' privacy rights. It ensures that sensitive information, such as personal data and biometric identifiers, is handled in compliance with privacy regulations and ethical standards, without compromising the effectiveness of threat detection capabilities. The Privacy Unit 226 anonymizes or de-identifies sensitive data, such as images, video feeds, or biometric information, to remove personally identifiable information (PII) and protect individuals' privacy. It replaces identifiable attributes with random identifiers or aggregates data to prevent the identification of specific individuals while still enabling analysis and processing for threat detection purposes. The Privacy Unit 226 selectively encrypts sensitive data to protect it from unauthorized access or disclosure. It ensures that the sensitive information collected by the overall system stays with the intended recipients. It employs encryption techniques to secure data at rest and in transit, ensuring that only authorized parties with the appropriate decryption key can access the plaintext information. Selective encryption allows for granular control over data protection while minimizing performance overhead.

The Privacy Unit 226 may pseudonymize sensitive data by replacing identifying information with pseudonyms or tokens, in addition to anonymization and encryption. Pseudonymization allows for the retention of data for analysis and processing while reducing the risk of re-identification and unauthorized disclosure. It enables data to be used for legitimate purposes without compromising individuals' privacy. The Privacy Unit 226 conducts privacy impact assessments to evaluate the potential risks and implications of data processing activities on individuals' privacy rights. It assesses the collection, use, and sharing of sensitive data within the system and implements measures to mitigate privacy risks and ensure compliance with applicable privacy regulations and standards. The Privacy Unit 226 provides mechanisms for obtaining user consent and enabling user control over the use and sharing of their personal data. It allows individuals to specify their privacy preferences, such as opting out of certain data processing activities or exercising their rights to access, rectify, or delete their personal information. The Privacy Unit 226 promotes transparency and accountability in data processing by providing clear information about how sensitive data is collected, used, and protected within the system. It maintains audit trails and logs of data processing activities to enable accountability and demonstrate compliance with privacy regulations and ethical principles. The Privacy Unit 226 continuously monitors data processing activities and privacy risks within the system, implementing measures to address emerging threats and vulnerabilities. It conducts periodic reviews and audits to ensure that privacy safeguards remain effective and up-to-date in the face of evolving privacy threats and regulatory requirements.

In an exemplary operation, a system to proactively detect in real time one or more threats in crowded areas, is disclosed herein. The imaging device 108 is configured to capture in real time at least one of a plurality of images and a plurality of video feed using a plurality of imaging sensors within a pre-defined area. In an embodiment, within the pre-defined area a plurality of individuals is present. In an embodiment, the plurality of imaging sensors may be incorporated within a plurality of drones. In an embodiment, the plurality of imaging sensors contains gigapixel cameras configured to capture images with resolutions equal or exceeding one billion pixels, and wherein each of the plurality of drones is configured to monitor one or more regions within the pre-defined area. In an embodiment, the encryption unit 224 may be configured to encrypt the plurality of images and the plurality of video feed using advanced encryption techniques to protect individual identities.

In an embodiment, the plurality of imaging sensors is positioned to capture the plurality of images and the plurality of video feed of the plurality of individuals in the crowded areas. In an embodiment, the plurality of imaging sensors comprises a combination of fixed and pan-tilt-zoom (PTZ) cameras strategically positioned in the crowded areas to provide comprehensive and complete designated area coverage and capture images and videos from multiple perspectives. In an embodiment, the plurality of imaging sensors comprise thermal imaging sensors and systems. In a further embodiment, the plurality of imaging sensors comprise different a heterogenous blend of types of imaging sensors.

After the plurality of images and the plurality of video feed are captured, the IDU 212 is configured to identify one or more suspected individuals from the plurality of individuals based on a comparison with a database comprising one or more user profiles using a machine learning model. In an embodiment, the one or more user profiles correspond to individuals on a watch list of one or more authorities. Further, the object detection unit 214 is configured to identify one or more suspicious objects within the at least one of the plurality of images and the plurality of video feed. Further, the behavioral detection unit 216 is configured to identify one or more behavioral patterns associated with each of the plurality of individuals using the machine learning model. Further, the behavioral detection unit 216 is configured to classify one or more behavioral patterns into one of a suspicious behavior and a non-suspicious behavior.

In an embodiment, the behavioral detection unit 216 is configured to capture behavioral aspects of an individual to identify the at least one threat. The behavioral aspects may be utilized for determining at least one of the suspected individuals. The behavioral detection unit 216 of the application server 104 is configured to comprehensively assess all observable behavioral aspects of an individual to identify potential threats in real-time. In an embodiment, the behavioral detection unit 216 may be configured to utilize one or more machine learning or artificial intelligence techniques for analyzing the behavioral aspects of an individual. The analysis encompasses but is not limited to, the factors comprising clothing pattern, logos, or symbols on the individual or on the clothing which may be considered as a threat. For example, in the clothing of an individual, the behavioral detection unit 216 evaluates any visible symbols, or logos on an individual's clothing that may be threatening or provide some other clue as to intention. This includes, for example, hate symbols, gang affiliations, or other markings associated with extremist ideologies or violence. The behavioral detection unit 216 is capable of recognizing these symbols in various contexts and flagging individuals who display such symbols for further investigation. Similar to clothing, tattoos are scrutinized for any threatening symbols.

The behavioral detection unit 216 can identify tattoos that convey messages or symbols related to hate groups, criminal organizations, or other dangerous entities. This analysis helps in profiling individuals who might pose a risk based on their affiliations or beliefs as indicated by their tattoos. The behavioral detection unit 216 monitors hand gestures and signals made by individuals, interpreting them in context to determine their significance. For example, if someone is observed making a Nazi salute at a Jewish rally or using gang-related hand signs in a public space, the behavioral detection unit 216 would flag this behavior as potentially threatening, prompting further action. However, the same Nazi salute at a Neo-Nazi rally, though offensive to most individuals, would not necessarily carry the same threatening connotation and would be accorded different significance by the behavioral detection unit 216 in this context. The behavioral detection unit 216 tracks and analyzes movement patterns that deviate from the normal movement patterns of individuals. This includes behaviors such as jumping on seats, erratic walking, sudden direction changes, abandoning parcels, or other forms of movement that might indicate distress, aggression, or intent to cause harm. Such behaviors are flagged for further scrutiny to assess the level of threat.

The behavioral detection unit 216 system is also equipped to evaluate facial expressions and body language, beyond physical actions of the individuals. This includes detecting signs of agitation, aggression, fear, or other emotional states that might suggest an individual is preparing to engage in hostile actions. The system assesses these cues in conjunction with other behaviors to form a comprehensive profile of potential threats. The behavioral detection unit 216 considers the context in which behaviors occur. For instance, a hand signal that might be innocuous in one setting could be highly threatening in another. The behavioral detection unit 216 can better assess whether certain behaviors pose a real threat, by analyzing the situation and surroundings.

The behavioral detection unit 216 can also analyze spoken words and vocal tone to detect aggression, threats, or hostility, while primarily focused on visual cues. This auditory analysis complements the visual assessments to provide a more complete understanding of an individual's behavior. The behavioral detection unit 216 observes interactions between individuals to identify signs of collusion, intimidation, or coordinated efforts to cause harm. For example, if two individuals are seen engaging in suspicious communication or behavior, the system can flag this interaction as part of a potential threat scenario.

The threat detection unit 216 is configured to identify the one or more threats based on at least one of the identified one or more suspected individuals, the identified one or more suspicious objects, and the identified one or more behavioral patterns. After identifying the one or more threats, and the one or more suspected individuals, the threat detection unit 216 is configured to determine a precise location of the identified one or more threats. In an embodiment, the precise location is determined using geo-positioning techniques as well as utilizing location identification information from the imaging devices.

In response to such a determination, the alerting unit 220 is configured to transmit a notification of the identified one or more threats to the one or more authorities. In an embodiment, the notification comprises at least one of the precise locations of the threat, the identified one or more suspected individuals, the identified one or more suspicious objects, and the identified one or more behavioral patterns, and the plurality of images and the plurality of video feed.

In an embodiment, the tracking unit 222 is configured to identify if the one or more suspected individuals is moving. In an embodiment, if the one or more suspected individuals is moving then the tracking unit 222 is configured to track in real-time a movement information of the one or more suspected individuals. In an embodiment, the real-time movement information is transmitted to the one or more authorities. Further, the object detection unit is configured to identify one or more suspicious objects being in possession within the one or more suspected individuals or within a pre-defined vicinity of the one or more suspected individuals. In an embodiment, the one or more suspicious objects comprise but are not limited to handguns, stun guns, tasers, long guns, knives, explosive devices, or packages that contain an object of threat.

The tracking unit 222 may be further configured to monitor user gait and perform mobility analysis for identifying and monitoring individuals in crowded areas. Gait, the unique manner in which a person walks, provides a distinct biometric signature that can be used to recognize and differentiate individuals. Such analysis leverages advanced machine learning algorithms to capture and interpret walking patterns, which are less likely to be altered or disguised compared to facial features. By continuously monitoring the gait and mobility patterns of individuals in a crowd, the system can detect anomalies and deviations from typical behavior, potentially flagging suspects who attempt to disguise their identity or intentions and thus assist in detecting the one or more threats or suspected individuals.

Gait analysis adds an extra layer of security by providing a non-intrusive and reliable method to track and identify individuals. The system can recognize gait patterns from a distance and through various perspectives, making it particularly useful in scenarios where facial recognition might be obstructed or ineffective, such as in dense crowds or poor lighting conditions. Moreover, combining gait analysis with other biometric data, such as facial recognition and emotional state detection, enhances the accuracy and robustness of suspect identification. For instance, an individual displaying erratic walking patterns, coupled with signs of distress or anxiety, can be prioritized for further scrutiny by security personnel. This multi-dimensional approach ensures a comprehensive surveillance system capable of maintaining public safety in dynamic and complex environments.

In an embodiment, the privacy unit 226 is configured to execute the machine learning model using secure multi-party computation or homomorphic encryption. In an embodiment, privacy unit 226 is configured to perform facial recognition on the encrypted plurality of images and the encrypted plurality of video feed. In an embodiment, the privacy unit 226 is configured to generate anonymized or de-identified facial recognition results while preserving privacy. In an embodiment, the privacy unit 226 is configured to output recognized individuals' identities for authorized purposes, ensuring privacy compliance in crowded areas.

In an embodiment, the machine learning model is configured to dynamically adjust facial recognition parameters based on crowd density in the crowded areas. The machine learning model is configured to detect emotional states, including happiness, sadness, anger, fear, and surprise, from facial expressions of the one or more suspected individuals. In an embodiment, the machine learning model is configured to utilize a fusion model to create a comprehensive and a multi-dimensional representation of plurality of individuals in the crowded area. In an embodiment, the machine learning model is configured to identify the one or more suspected individuals based on the fusion model.

In an embodiment, the ability to detect and analyze emotional states from facial expressions provides a significant enhancement to security systems, particularly in crowded areas where identifying potential threats swiftly and accurately is paramount. Integrating emotional state detection and behavioral emotional analysis into facial recognition systems as proposed in the present system offers a multi-dimensional approach to threat detection, enabling the identification of suspects based not only on their appearance but also on their emotional cues and behaviors. In an embodiment, the system utilizes CNNs to detect subtle facial movements and expressions that correspond to different emotions. This includes analyzing the positions and shapes of facial landmarks like the eyes, eyebrows, mouth, and nose. Further, one or more RNNs and Long Short-Term Memory (LSTM) networks may be deployed in the system that can track changes in an individual's emotional state over time. Such temporal analysis helps in distinguishing between transient emotions and sustained emotional states that might indicate stress or anxiety. The ability to detect emotional cues that precede suspicious behaviors allows for proactive measures, potentially preventing incidents before they occur.

In an embodiment, the machine learning model is configured to dynamically adjust one or more facial recognition parameters based on complexity of the crowed area, presence of one or more occlusions, and a level of background noise in the plurality of images and the plurality of videos. In an embodiment, the system utilizes a neural network-based architecture for the machine learning model. In an embodiment, the neural network is trained on a dataset comprising diverse facial images under various lighting conditions, angles, and occlusions to adaptively adjust one or more facial recognition parameters. In an embodiment, the processor is configured to optimize one or more computational resources for execution of the machine learning model. In an embodiment, the processor is configured to employ reinforcement learning techniques to dynamically optimize one or more computational resources based on real-time feedback from the system's performance, crowd density fluctuations, and one or more priority areas identified from the crowded area. In an embodiment, the processor is configured to leverage hardware acceleration technologies, including the latest and most powerful graphics processing units (GPUs) and field-programmable gate arrays (FPGAs), to accelerate image processing and facial recognition tasks, enabling rapid analysis of streaming video feeds in crowded areas.

Further, the machine learning model is configured to generate one or more security recommendations for the authorities based on detected emotional states to enhance situational awareness in the crowded areas. In an embodiment, the one or more security recommendations comprise sending a notification to the non-suspected individuals in the crowded area to alert about a potential security threat in the crowded area. In an embodiment, the notification comprises stepwise instructions to disperse away from the crowded area without creating a panic situation.

Further, transceiver 206 is configured to transmit a notification of the identified one or more threats to the one or more authorities. In an embodiment, the notification comprises at least one of the precise locations of the threat, the identified one or more suspected individuals, the identified one or more suspicious objects, and the identified one or more behavioral patterns, and the plurality of images and the plurality of video feed.

FIG. 3 is a flowchart that illustrates a method to proactively detect in real time one or more threats in crowded areas, in accordance with an embodiment of present disclosure. The method begins in a Start step 302 and proceeds to a step 304. At step 304, the application server 104 is configured to capture in real time at least one of a plurality of images and a plurality of video feed using a plurality of imaging sensors within a pre-defined area. In an embodiment, within the pre-defined area a plurality of individuals is present. At step 306, the application server 104 is configured to perform at least one of identifying one or more suspected individuals from the plurality of individuals based on a comparison with a database comprising one or more user profiles using a machine learning model. and identifying one or more suspicious objects within the at least one of the plurality of images and the plurality of video feed. At step 308, the application server 104 is configured to identify the one or more threats based on at least one of the identified one or more suspected individuals, the identified one or more suspicious objects. At step 310, the application server 104 is configured to determine a precise location of the identified one or more threats and transmit a notification of the identified one or more threats to the one or more authorities. In an embodiment, the notification comprises at least one of the precise locations of the threat, the identified one or more suspected individuals, the identified one or more suspicious objects, and the plurality of images and the plurality of video feed. Control passes to end step 312.

Figure 4:
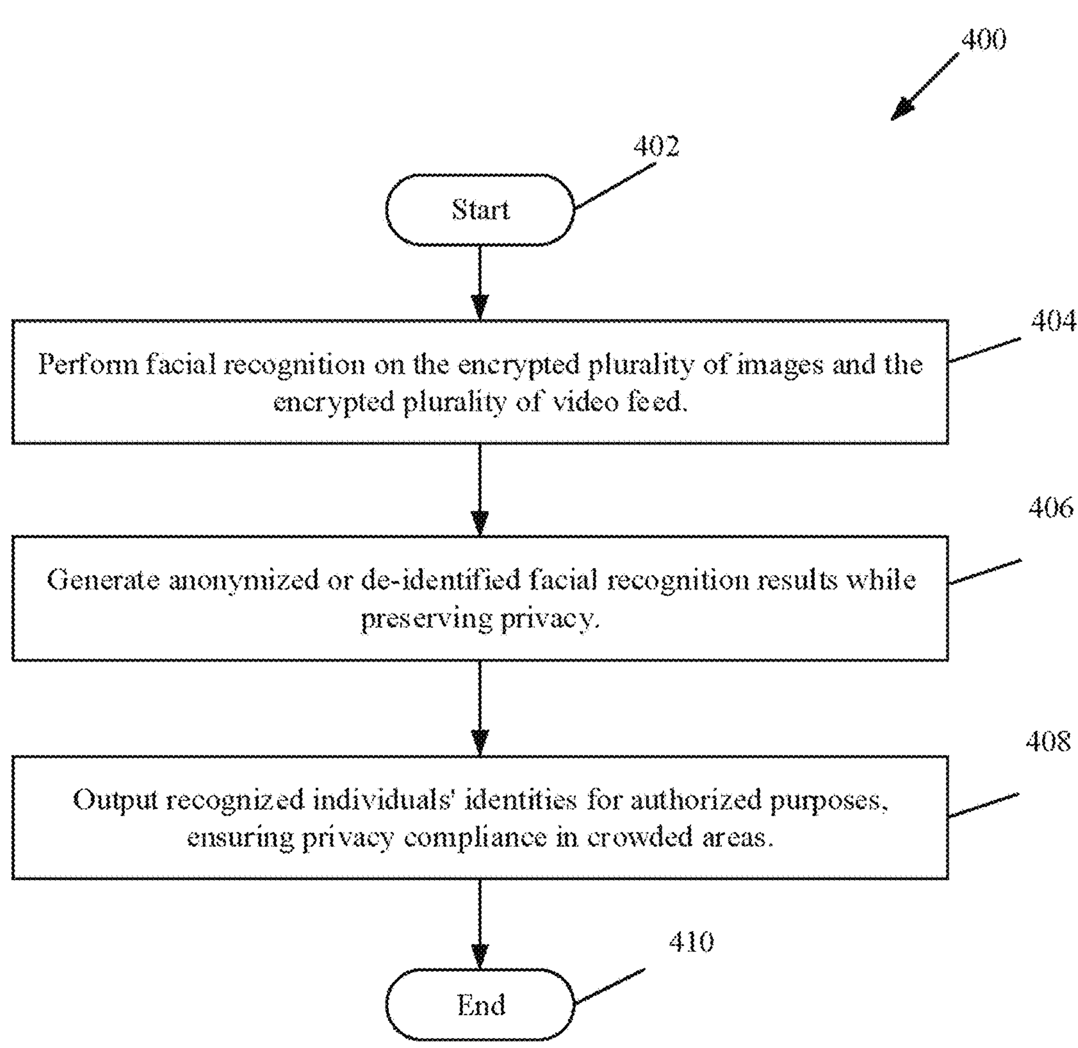
FIG. 4 is a flowchart that illustrates another method to proactively detect in real time one or more threats in crowded areas while preserving privacy, in accordance with an embodiment of present disclosure.

FIG. 4 is a flowchart that illustrates another method to proactively detect in real time one or more threats in crowded areas while preserving privacy, in accordance with an embodiment of present disclosure. The method begins in a Start step 402 and proceeds to a step 404. At step 402 the privacy unit 226 is configured to perform facial recognition on the encrypted plurality of images and the encrypted plurality of video feed. At step 404, the privacy unit 226 is configured to generate anonymized or de-identified facial recognition results while preserving privacy. At step 406, the privacy unit 226 is configured to output recognized individuals' identities for authorized purposes, ensuring privacy compliance in crowded areas. Control passes to end step 408.

A working example of the present disclosure in the context of a crowded urban area such as a busy city center during a major event or a transportation hub during peak hours. The system consists of a network of imaging sensors deployed throughout the crowded area. These sensors include high-resolution cameras mounted on fixed poles, as well as drones equipped with gigapixel cameras for aerial surveillance. The imaging sensors capture continuous images and video feeds of the crowded area in real-time, providing comprehensive coverage from multiple perspectives. The captured data is streamed to a centralized processing unit for analysis. The system analyzes the captured images and video feeds to identify potential threats, using machine learning algorithms. This includes detecting individuals on watch lists, recognizing suspicious objects such as unattended bags or weapons, and analyzing behavioral patterns indicative of security risks. The machine learning model evaluates the behavior of individuals within the crowded area, distinguishing between normal activities and suspicious behaviors such as loitering, erratic movements, or aggressive gestures. By combining information about suspected individuals, suspicious objects, and behavioral patterns, the system identifies potential threats in real-time. For example, it may detect a person on a watch list carrying a suspicious package and exhibiting nervous behavior. The system may also determine that a person not on any known watch list is exhibiting suspicious behavior or has in his possession a suspicious object. The system may also detect a person who is in a restricted area, despite not being on an authorization list, even if there is no detectable suspicious object. The system will then determine the precise location within the crowded area and immediately notifies relevant authorities upon identifying that threat. The notification includes detailed information such as the threat location, description of suspected individuals or objects, and analysis of behavioral patterns. Authorities receive the notification and deploy appropriate response measures, such as dispatching security personnel to the threat location or initiating evacuation procedures if necessary. The timely response minimizes the potential impact of security incidents and ensures public safety. The system employs advanced encryption techniques to protect individual identities and ensure compliance with privacy regulations throughout the process. Facial recognition results are anonymized or de-identified to preserve privacy while still enabling effective threat detection. This working example demonstrates how the present disclosure operates in a real-world scenario to proactively detect and respond to security threats in crowded areas. The present disclosure enhances security measures, reduces response times, and safeguards public safety in dynamic urban environments, by leveraging advanced technologies and automated surveillance capabilities.

A detailed working example of the present disclosure, outlining specific values and parameters. The system consists of 50 imaging sensors strategically positioned throughout a crowded city center. Each sensor includes a high-resolution camera capable of capturing images with resolutions exceeding one billion pixels. Additionally, 10 drones equipped with gigapixel cameras are deployed for aerial surveillance, covering areas inaccessible to fixed sensors. The imaging sensors capture images and video feeds at a rate of 30 frames per second, providing continuous surveillance of the city center. The captured data is streamed to a centralized processing unit equipped with high-performance GPUs and FPGAs for real-time analysis. A machine learning model trained on a dataset comprising diverse facial images and behavioral patterns is deployed for threat detection. The model utilizes facial recognition algorithms to identify individuals on watch lists provided by law enforcement agencies. Thresholds for suspicious behaviors, such as loitering, running, or carrying large objects, are predefined based on historical data and security protocols. Behavioral patterns are analyzed in real-time, with specific parameters including walking speed, direction, and proximity to sensitive locations (e.g., entrances, checkpoints). The model dynamically adjusts facial recognition parameters based on crowd density, lighting conditions, and occlusions to enhance accuracy. Suspected individuals identified by the machine learning model are also cross-referenced with the watch list database. Suspicious objects, such as unattended bags or bulky items, are detected using object recognition algorithms. Behavioral patterns indicative of potential threats, such as sudden changes in direction or interactions with multiple individuals, are flagged for further analysis. The system determines the precise location within the city center using GPS coordinates from the imaging sensors, upon detecting a threat. A notification containing detailed information, including threat location, description of suspected individuals or objects, and analysis of behavioral patterns, is transmitted to law enforcement agencies within milliseconds.

Further, after threat identification, the law enforcement agencies receive the notification on their mobile devices or command centers, enabling them to initiate immediate response measures. Security personnel are dispatched to the threat location, and appropriate actions, such as interception, interrogation, or evacuation, are executed based on the severity of the threat. Facial recognition results are encrypted using homomorphic encryption techniques to protect individual identities while still enabling effective threat detection. Anonymized or de-identified facial recognition results are provided to authorize personnel for privacy compliance. This detailed working example showcases the practical implementation of the claimed invention and the present disclosure, highlighting specific values and parameters for system setup, real-time monitoring, threat detection, localization, notification, response, and privacy preservation.

Further elaborated is another working example on capturing behavioral aspects of an individual. Imagine a scenario at a large public event, such as a political rally, where an AI system is deployed to monitor the crowd for potential threats. As individuals enter the event, the system begins a comprehensive analysis of their behaviors, starting with visible aspects like clothing. The AI identifies a person wearing a jacket with an insignia that is commonly associated with a known extremist group. Recognizing this symbol, the system flags the individual for closer monitoring. As the event progresses, the system detects that the same individual has tattoos on their forearms that include symbols linked to hate groups. The AI cross-references these symbols with its database, confirming the presence of markings that are associated with violent ideologies. This additional data point strengthens the profile of the individual as a potential threat. The AI continues to monitor the individual's behavior and notices that they make a specific hand signal that is commonly used by members of a violent gang. The signal is not directed at anyone in particular, but the AI considers the context this is a politically charged event where such gestures could incite violence. The system immediately flags this gesture as significant.

In addition to analyzing physical symbols and gestures, the AI tracks the person's movement patterns. It observes that the individual is moving in an erratic manner, frequently changing direction and avoiding security personnel. This unusual movement pattern is another red flag, suggesting that the person might be attempting to avoid detection or carry out a harmful act. The system also assesses the individual's facial expressions and body language. It detects signs of agitation and nervousness, such as clenched fists and a tense jawline, which are consistent with someone preparing to engage in hostile actions. The AI correlates these signs with the previous data points to build a comprehensive profile indicating that this individual could pose a serious threat. Throughout this process, the AI considers the broader context of the event. It understands that in this environment, where emotions are already high, the combination of extremist symbols, threatening gestures, erratic behavior, and signs of agitation significantly increases the likelihood of danger. Therefore, the system recommends immediate intervention by security personnel to prevent any potential escalation.

Simultaneously, the AI is also monitoring other individuals in the crowd. The AI system notices that the flagged person is attempting to communicate with another attendee who exhibits similar behaviors, such as making the same gang-related hand signals and avoiding security. The system analyzes this interaction and flags it as a coordinated effort, further elevating the threat level. The AI system provides a real-time, comprehensive assessment of potential threats, enabling security teams to act swiftly and effectively, by integrating all these factors clothing, tattoos, hand signals, movement patterns, facial expressions, body language, and contextual behavior.

Various embodiments of the disclosure encompass numerous advantages including the present disclosure enables real-time detection of threats, allowing for immediate response and mitigation measures to be implemented, thus reducing the risk of security incidents. The present disclosure eliminates the need for manual monitoring, by automating surveillance processes using imaging sensors and machine learning models. The present disclosure enables targeted monitoring of suspected individuals and suspicious objects, allowing security resources to be allocated more effectively and minimizing false alarms. The present disclosure improves the accuracy of threat detection, reducing false positives and ensuring that genuine security risks are identified promptly, through behavioral pattern analysis and machine learning algorithms. The present disclosure incorporates advanced encryption techniques to protect individual identities and preserve privacy while still enabling effective threat detection, addressing concerns related to mass surveillance and privacy violations. The present disclosure ensures efficient processing of surveillance data, enabling scalability and adaptability to varying crowd densities and security priorities, by optimizing computational resources using reinforcement learning and hardware acceleration. Real-time notifications provided by the present disclosure enable authorities to respond swiftly to security threats, minimizing the potential impact of incidents and enhancing public safety. The present disclosure is scalable and adaptable to evolving security threats and changing environmental conditions, ensuring long-term effectiveness in safeguarding crowded areas without significant infrastructure changes.

The present disclosure involves a concrete and specific implementation of technology to address a real-world problem. The proactive detection of threats in crowded areas. It utilizes tangible components such as imaging sensors, machine learning algorithms, and real-time data processing techniques to achieve its objectives. Additionally, the present disclosure provides a detailed description of its functionality, including the steps involved in threat detection, notification to authorities, and privacy preservation measures. Thus, the present disclosure offers a practical solution to a pressing security challenge. Furthermore, the present disclosure provides integration of various technologies and methodologies to enhance security measures in crowded areas. While individual components such as imaging sensors and machine learning algorithms may be known in the art, the specific combination and application of these components to achieve real-time threat detection and response in crowded environments solves a technical problem. The present disclosure's use of advanced encryption techniques for privacy preservation and optimization of computational resources further distinguishes it from conventional security systems.

In light of the above mentioned advantages and the technical advancements provided by the disclosed method, device, and system, the claimed steps as discussed above are not routine, conventional, or well understood in the art, as the claimed steps enable the technical solutions to the existing problems in conventional technologies. Further, the claimed steps clearly bring an improvement in the functioning of the device itself as the claimed steps provide a technical solution to a technical problem.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

The invention claimed is:

1. A system to proactively detect in real time at least one threats in crowded areas, the system comprising:
- a processor; and
- a memory communicatively coupled to the processor, wherein the memory stores processor-executable instructions, which, on execution, causes the processor to:
  - capture a plurality of images in real time in at least one locale;
  - encrypt the plurality of images using advanced encryption techniques to protect individual identities;
  - identify at least one threats based on results of at least three identification tests performed, wherein identification of the at least one threats only requires one identification test to have a positive result and said three identification tests are selected from a set of tests consisting of:
    - identifying at least one suspected individuals from the plurality of images using a machine learning model;
    - identifying at least one suspicious objects within at least one of the plurality of images; and
    - identifying at least one behavioral patterns associated with at least one individuals using the machine learning model after further classifying the at least one behavioral patterns into one of a suspicious behavior and a non-suspicious behavior;
  - determine a precise location of the identified at least one threats;
  - perform facial recognition on the encrypted plurality of images;
  - generate anonymized facial recognition results;
  - output recognized individuals' identities for authorized purposes; and
  - transmit a notification of the identified at least one threats to at least one authorities;
  - wherein identifying the at least one suspected individuals utilizes the machine learning model configured to utilize a fusion model to create a comprehensive and a multi-dimensional representation of plurality of individuals in the crowded areas, wherein the machine learning model is configured to identify the at least one suspected individuals based on the fusion model.

2. The system as claimed in claim 1, wherein the processor is configured to identify if the at least one suspected individuals is moving, wherein if the at least one suspected individuals is moving then tracking in real-time a movement information of the at least one suspected individuals, wherein the real-time movement information is transmitted to the at least one authorities.

3. The system as claimed in claim 1, wherein the processor is configured to identify the at least one suspicious objects being in possession within the at least one suspected individuals or within a pre-defined vicinity of the at least one suspected individuals; identify at least one behavioral patterns associated with each of a plurality of individuals using the machine learning model; and classify the at least one behavioral patterns into one of a suspicious behavior and a non-suspicious behavior, wherein identification of the one or more threats is based on the identified at least one behavioral patterns, wherein at least one user profiles correspond to individuals on a watch list of the at least one authorities.

4. The system as claimed in claim 1, wherein the at least one suspicious objects comprises handguns, long guns, knives, explosive devices, or packages that contain an object of threat.

5. The system as claimed in claim 1, further comprising a plurality of imaging sensors being incorporated within a plurality of drones, wherein the plurality of imaging sensors contains gigapixel cameras configured to capture images with resolutions equal or exceeding one billion pixels, and wherein each of the plurality of drones is configured to monitor at least one regions within the pre-defined area.

6. The system as claimed in claim 1, wherein the precise location is determined using geo-positioning techniques.

7. The system as claimed in claim 1, wherein the processor is configured to execute the machine learning model using secure multi-party computation or homomorphic encryption.

8. The system as claimed in claim 1, wherein a plurality of imaging sensors is positioned to capture a plurality of images of the plurality of individuals in the crowded areas, wherein the plurality of imaging sensors comprises a combination of fixed and pan-tilt-zoom (PTZ) cameras strategically positioned in the crowded areas to provide comprehensive coverage and capture images and videos from multiple perspectives.

9. The system as claimed in claim 1, wherein the machine learning model is configured to dynamically adjust facial recognition parameters based on crowd density in the crowded areas.

10. The system as claimed in claim 1, wherein the machine learning model is configured to detect emotional states, including happiness, sadness, anger, fear, and surprise, from facial expressions of the at least one suspected individuals.

11. The system as claimed in claim 1, wherein the machine learning model is configured to generate at least one security recommendations for the authorities based on detected emotional states to enhance situational awareness in the crowded areas, wherein the at least one security recommendations comprises sending a notification regarding non-suspected individuals in the crowded areas to alert about a potential security threat in the crowded areas, wherein the notification comprises stepwise instructions to disperse away from the crowded areas without creating a panic situation.

12. The system as claimed in claim 1, wherein the system utilizes a neural network-based architecture for the machine learning model, wherein the neural network is trained on a dataset comprising diverse facial images under various lighting conditions, angles, and occlusions to adaptively adjust at least one facial recognition parameters.

13. The system as claimed in claim 1, wherein the processor is configured to optimize at least one computational resources for execution of the machine learning model, wherein the processor is configured to employ reinforcement learning techniques to dynamically optimize at least one computational resources based on real-time feedback from the system's performance, crowd density fluctuations, and at least one priority areas identified from the crowded areas.

14. The system as claimed in claim 1, wherein the processor is configured to leverage hardware acceleration technologies, including graphics processing units (GPUs) and field-programmable gate arrays (FPGAs), to accelerate image processing and facial recognition tasks, enabling rapid analysis of streaming video feeds in the crowded areas.

15. A method for proactively detecting in real time at least one threats in crowded areas, the method comprising:

capturing a plurality of images and a plurality of video feed using a plurality of imaging sensors within a pre-defined area, wherein within the pre-defined area a plurality of individuals are present;

encrypting the plurality of images and the plurality of video feed using advanced encryption techniques to protect individual identities;

performing at least one test selected from a set of tests consisting of:

identifying at least one suspected individuals from the plurality of images using a machine learning model, wherein the machine learning model is configured to utilize a fusion model to create a comprehensive and a multi-dimensional representation of plurality of individuals in the crowded areas, wherein the machine learning model is configured to identify the at least one suspected individuals based on the fusion model;

identifying at least one suspicious objects within at least one of the plurality of images; and, identifying at least one behavioral patterns associated with at least one individuals using the machine learning model after further classifying the at least one behavioral patterns into one of a suspicious behavior and a non-suspicious behavior;

identifying, by the processor, the at least one threats based on at least one of the identified at least one suspected individuals, the identified at least one suspicious objects and the at least one behavioral patterns;

determining, by the processor, a precise location of the identified at least one threats; and performing facial recognition on the encrypted plurality of images and the encrypted plurality of video feed;

generating anonymized facial recognition results;

outputting recognized individuals' identities for authorized purposes;

transmitting, by the processor, a notification of the identified at least one threats to at least one authorities.

16. An imaging device to proactively detect in real time at least one threats in crowded areas, the imaging device comprising:

a processor; and a memory communicatively coupled to the processor, wherein the memory stores processor-executable instructions, which, on execution, causes the processor to:

capture a plurality of images and a plurality of video feed using a plurality of imaging sensors within a pre-defined area, wherein within the pre-defined area a plurality of individuals are present;

encrypt the plurality of images and the plurality of video feed using advanced encryption techniques to protect individual identities;

perform each of the tests selected from a set of tests consisting of:

identifying at least one suspected individuals from the plurality of images using a machine learning model, wherein the machine learning model is configured to utilize a fusion model to create a comprehensive and a multi-dimensional representation of plurality of individuals in the crowded areas, wherein the machine learning model is configured to identify the at least one suspected individuals by based on the fusion model;

identifying at least one suspicious objects within at least one of the plurality of images; and identifying at least one behavioral patterns associated with at least one individuals using the machine learning model after further classifying the at least one behavioral patterns into one of a suspicious behavior and a non-suspicious behavior;

identify the at least one threats based on outcomes of the three tests, at least one test of the three tests to have a positive result;

determine a precise location of the identified at least one threats;

perform facial recognition on the encrypted plurality of images and the encrypted plurality of video feed;

generate anonymized facial recognition results;

output recognized individuals' identities for authorized purposes; and, transmit a notification of the identified at least one threats to at least one authorities.

* * * * *